United States Patent
Imoto

(10) Patent No.: US 11,307,140 B2
(45) Date of Patent: Apr. 19, 2022

(54) SIGNAL ACQUISITION DEVICE

(71) Applicant: OLYMPUS CORPORATION, Tokyo (JP)

(72) Inventor: Kentaro Imoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 358 days.

(21) Appl. No.: 16/715,088

(22) Filed: Dec. 16, 2019

(65) Prior Publication Data

US 2020/0116634 A1    Apr. 16, 2020

Related U.S. Application Data

(63) Continuation of application No. PCT/JP2017/024521, filed on Jul. 4, 2017.

(51) Int. Cl.
*G01N 21/64* (2006.01)

(52) U.S. Cl.
CPC ... *G01N 21/6408* (2013.01); *G01N 2201/125* (2013.01)

(58) Field of Classification Search
None
See application file for complete search history.

(56) References Cited

U.S. PATENT DOCUMENTS

| | | | |
|---|---|---|---|
| 5,909,278 A | 6/1999 | Deka et al. | |
| 2004/0126275 A1 | 7/2004 | Doering et al. | |
| 2009/0222503 A1* | 9/2009 | Palais | G16B 25/00 708/277 |

(Continued)

FOREIGN PATENT DOCUMENTS

| | | |
|---|---|---|
| JP | H09-159527 A | 6/1997 |
| JP | 2002-107300 A | 4/2002 |

(Continued)

OTHER PUBLICATIONS

International Search Report dated Oct. 10, 2017 issued in PCT/JP2017/024521.

(Continued)

*Primary Examiner* — David P Porta
*Assistant Examiner* — Carolyn Fin
(74) *Attorney, Agent, or Firm* — Scully, Scott, Murphy & Presser, P.C.

(57) ABSTRACT

A signal acquisition device includes: a light source that oscillates pulsed laser light at a specific repetition period; an optical system that focuses the laser light onto a sample, and that collects generated fluorescence; a photodetector that detects the fluorescence collected by the optical system; an A/D converter that samples an intensity signal of the detected fluorescence, in synchronization with the repetition period of the light source unit, at a period that is an integer multiple of the repetition period, and that generates a digital intensity signal; and one or more processors comprising hardware, the one or more processors being configured to: obtain a fluorescence lifetime waveform on a basis of the generated digital intensity signal; and calculate a fluorescence lifetime coefficient from a waveform obtained by removing a region not corresponding to an exponential function from the obtained fluorescence lifetime waveform.

15 Claims, 8 Drawing Sheets

(56) References Cited

U.S. PATENT DOCUMENTS

2011/0242485 A1 10/2011 Kishimoto et al.

FOREIGN PATENT DOCUMENTS

| JP | 2005-300311 A | 10/2005 |
|----|---------------|---------|
| JP | 2006-266905 A | 10/2006 |
| JP | 2008-32440 A | 2/2008 |
| JP | 2011-212116 A | 10/2011 |
| JP | 2012-132742 A | 7/2012 |

OTHER PUBLICATIONS

Li, Day-Uei et al., "On-chip, time-correlated,fluorescence lifetime extraction algorithms and error analysis", Journal of the Optical Society of America A (May 2008), vol. 25, Issue 5, pp. 1190-1198, cited in spec on p. 2.

* cited by examiner

SIGNAL ACQUISITION DEVICE

CROSS-REFERENCE TO RELATED APPLICATIONS

This is a continuation of International Application PCT/JP2017/024521, with an international filing date of Jul. 4, 2017, which is hereby incorporated by reference herein in its entirety.

TECHNICAL FIELD

The present invention relates to a signal acquisition device.

BACKGROUND ART

There is a known signal acquisition device that measures a fluorescence lifetime by performing an A/D conversion on fluorescence from a sample and observing a temporal change thereof (for example, see Patent Literature 1 and Non Patent Literature 1).

This signal acquisition device acquires, in time series, the fluorescence emitted from the sample by exciting the sample with pulsed excitation light, thereby obtaining a fluorescence decay graph. In this case, a measurement error occurs in the obtained fluorescence decay graph due to a finite system response. In order to reduce this error, the sampling period is reduced to such a degree that the influence of the system response can be ignored, or estimation using an iterative method with a known system response is performed.

CITATION LIST

Patent Literature

{PTL 1} U.S. Pat. No. 5,909,278, specification

Non Patent Literature

{NPL 1} Journal of the Optical Society of America A, Vol. 25, Issue 5, pp. 1190-1198 (2008)

SUMMARY OF INVENTION

An aspect of the present invention is directed to a signal acquisition device including: a light source that oscillates pulsed laser light at a specific repetition period;

an optical system that focuses the laser light onto a sample, and that collects generated fluorescence; a photodetector that detects the fluorescence collected by the optical system; an A/D converter that samples an intensity signal of the detected fluorescence, in synchronization with the repetition period of the light source unit, at a period that is an integer multiple of the repetition period, and that generates a digital intensity signal; and one or more processors comprising hardware, the one or more processors being configured to: obtain a fluorescence lifetime waveform on a basis of the generated digital intensity signal; and calculate a fluorescence lifetime coefficient from a waveform obtained by removing a region not corresponding to an exponential function from the obtained fluorescence lifetime waveform.

DESCRIPTION OF EMBODIMENT

A signal acquisition device 1 according to an embodiment of the present invention will be described below with reference to the drawings.

Figure 1:
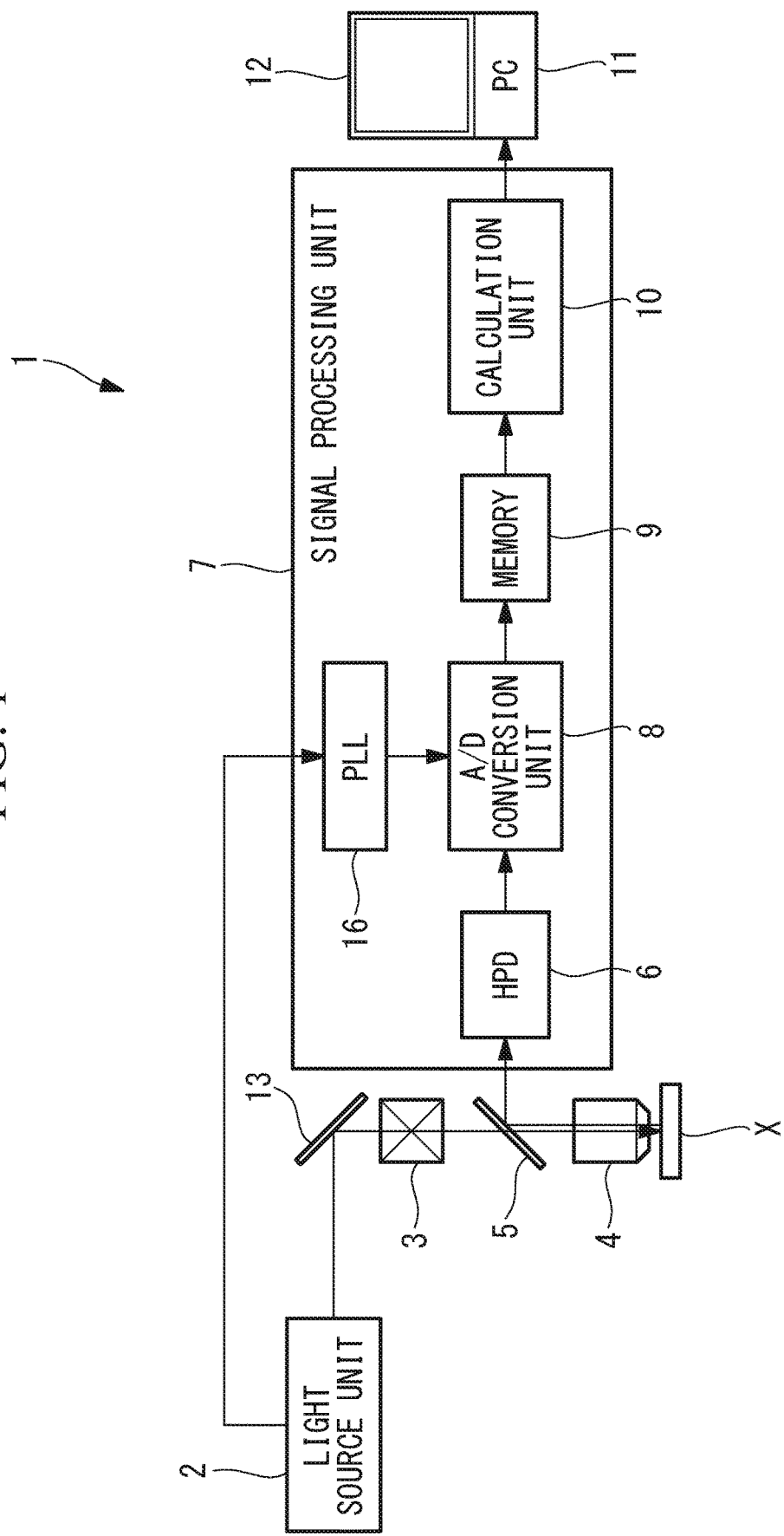
FIG. 1 is an overall configuration diagram showing a signal acquisition device according to an embodiment of the present invention.

As shown in FIG. 1, the signal acquisition device 1 according to this embodiment is a laser scanning microscope. The signal acquisition device 1 includes: a light source unit 2 that emits pulsed laser light; a scanner (scanning portion) 3 that two-dimensionally scans the laser light emitted from the light source unit 2; an objective lens (optical system) 4 that focuses the laser light scanned by the scanner 3 onto a sample X, and that collects fluorescence generated on the sample X; a dichroic mirror 5 that branches the fluorescence collected by the objective lens 4 from an optical path of the laser light; a photodetector (detection unit, hybrid photodetector: HPD) 6 that detects the fluorescence reflected by the dichroic mirror 5; and a signal processing unit 7 that processes an intensity signal of the fluorescence detected by the photodetector 6. In the figure, reference sign 13 indicates a mirror that reflects the laser light from the light source unit 2 to the scanner 3.

The light source unit 2 emits, for example, ultra-short pulse laser light at a repetition period of 80 MHz.

The scanner 3 is, for example, a so-called proximity galvanometer mirror in which two galvanometer mirrors are arranged so as to face each other in proximity, said galvanometer mirrors being swiveled about axes in a mutually twisted positional relationship.

The signal processing unit 7 includes: a phase-locked loop (PLL) 16 that generates a signal having a period that is an integer multiple of the repetition period, in synchronization with the timing at which the laser light is oscillated by the light source unit 2; an A/D conversion unit 8 that samples the intensity signal of the fluorescence detected by the photodetector 6 by using the signal generated by the phase-locked loop 16 and that converts the sampled intensity signal into a digital intensity signal; a memory 9 that stores the A/D-converted digital intensity signal; and a calculation unit 10 that calculates a fluorescence lifetime coefficient on the basis of the digital intensity signal stored in the memory 9. In the figure, reference sign 11 indicates a personal computer (PC) provided with a monitor (display unit) 12.

The signal generated by the phase-locked loop 16 has, for example, a period of 960 MHz, which is 12-times the repetition period of 80 MHz. In terms of time, the laser light is radiated at an interval of 12.5 ns, and sampling is performed at an interval of approximately 1 ns.

The memory 9 includes 12 storage regions and stores, for each repetition period of the laser light oscillation, the digital intensity signals that are A/D-converted in the individual sampling periods, in a superposed manner. In other words, the 12 storage regions correspond to delay times from the timing at which the laser light is radiated onto the sample X.

Figure 2:
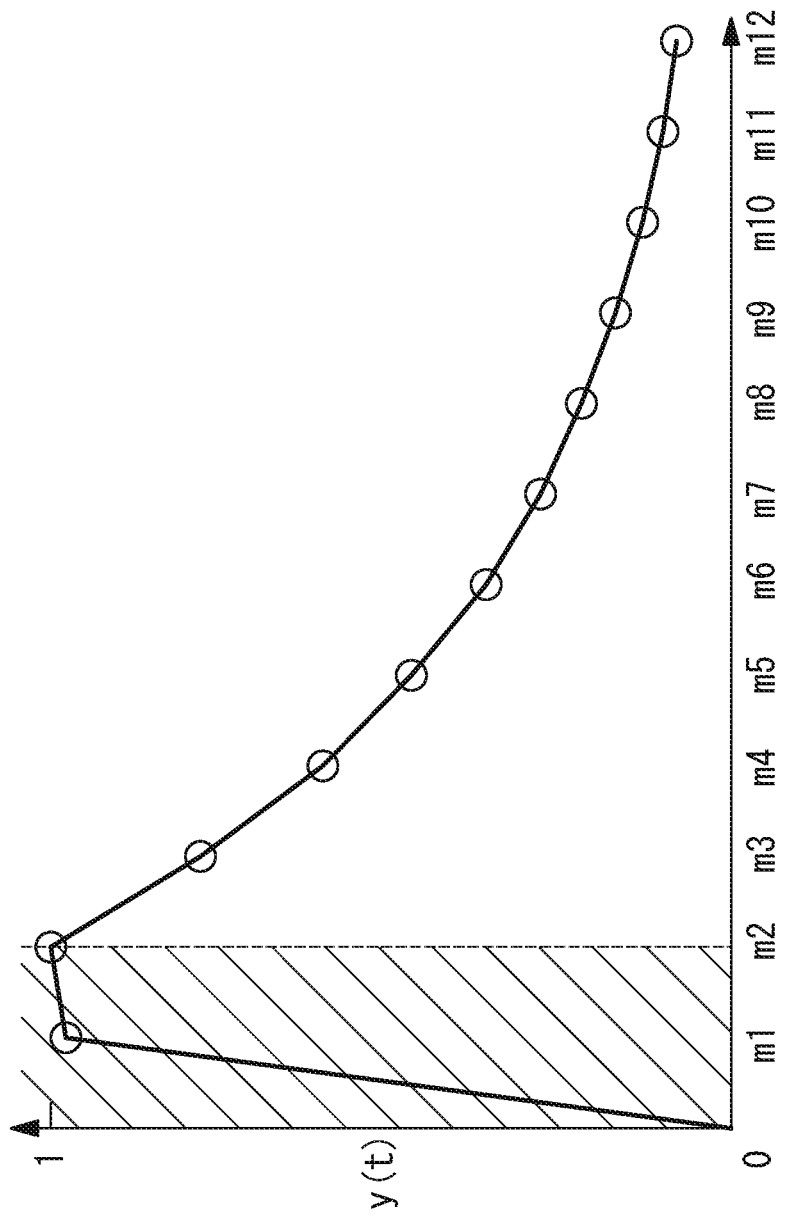
FIG. 2 is a diagram showing an example of a fluorescence lifetime waveform obtained by the signal acquisition device in FIG. 1.

At the individual scanning positions, after the laser light is radiated onto the sample X multiple times at the repetition period, the calculation unit (first calculation unit, second calculation unit) 10 plots the digital intensity signals output from the individual storage regions of the memory 9 for the delay times corresponding to the individual storage regions, thereby calculating, as shown in FIG. 2, a fluorescence lifetime waveform y(t) that indicates the relationship between the digital intensity signals and the delay times m1, m2, . . . m12.

Furthermore, the calculation unit 10 removes a region not corresponding to an exponential function from the calculated fluorescence lifetime waveform y(t), and calculates a fluorescence lifetime coefficient on the basis of a waveform obtained by removing said region.

In other words, the fluorescence lifetime waveform y(t) is theoretically represented by the equation below according to the exponential function.

$$y(t) = k \times \exp(-t/\tau)$$

Here, y(t) is the fluorescence lifetime waveform, k is the intensity coefficient, t is time, and $\tau$ is the fluorescence lifetime coefficient.

Figure 3:
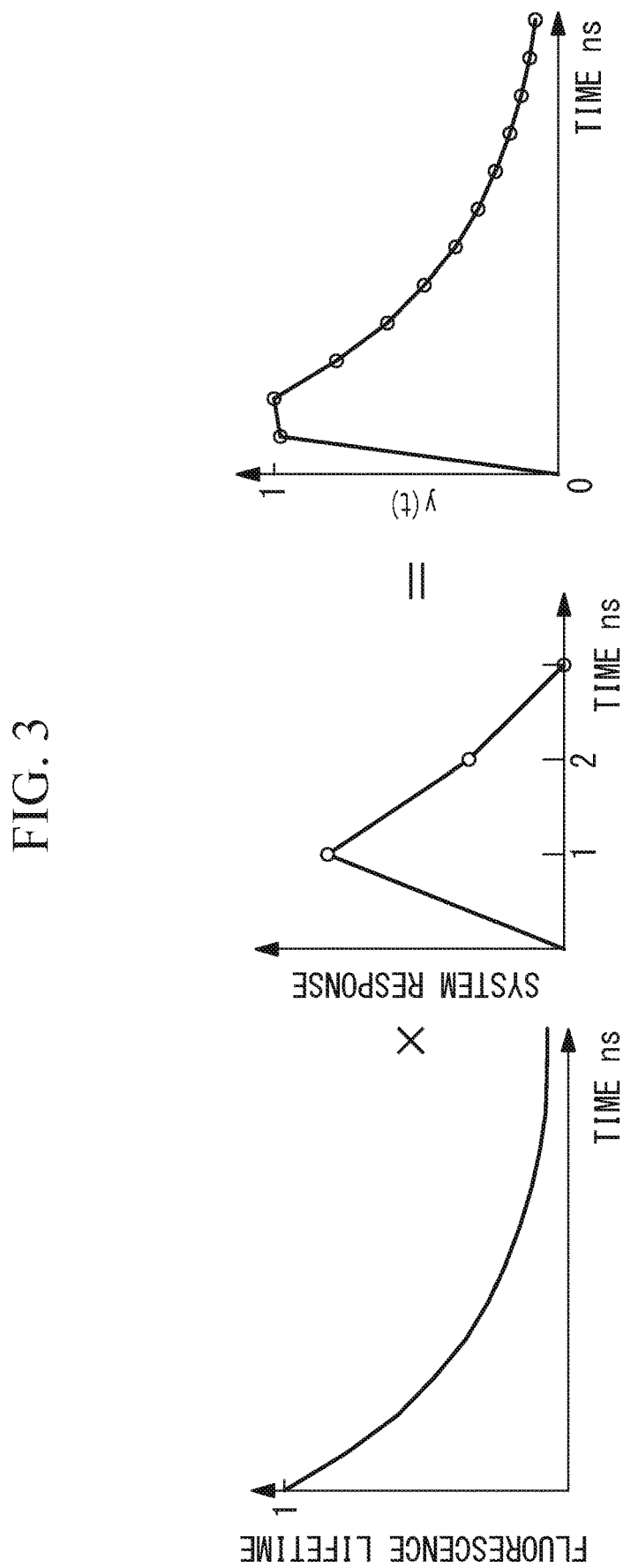
FIG. 3 is a diagram for explaining the fluorescence lifetime waveform in FIG. 2.
Figure 4:
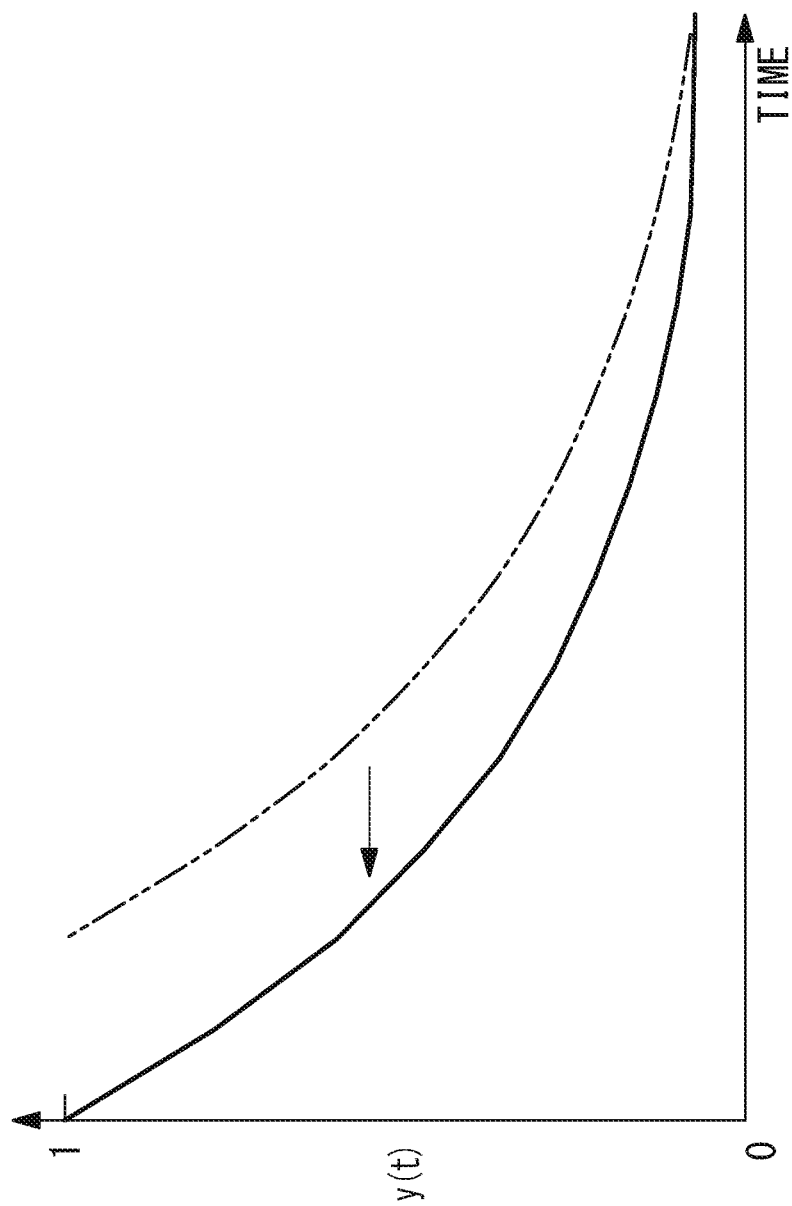
FIG. 4 is a diagram showing a waveform normalized by removing a system response from the fluorescence lifetime waveform in FIG. 2.

However, as shown in FIG. 3, a system response of the microscope is actually superimposed thereon; thus, as indicated by hatching in FIG. 2, a region that does not follow the exponential function is generated. Therefore, by removing the region not corresponding to the exponential function, as indicated by a chain line in FIG. 4, and by performing normalization as indicated by an arrow in FIG. 4, it is possible to obtain a fluorescence lifetime waveform y(t) without the influence of the system response, as indicated by a solid line in FIG. 4.

Here, the region not corresponding to the exponential function is equivalent to the width of a system-response function waveform, for example, 2 ns in the case of FIG. 3.

In this embodiment, the abovementioned processing is performed, focusing on the fact that exponential functions have a similarity, and that it is possible to obtain the same waveform by cutting off at an arbitrary point and performing normalization.

Therefore, by removing the region for the first 2 ns corresponding to the system response from the fluorescence lifetime waveform y(t) shown in FIG. 2, and by performing normalization for expanding the remaining region by 2 ns, it is possible to obtain a waveform from which the influence of the system response is removed.

Figure 5:
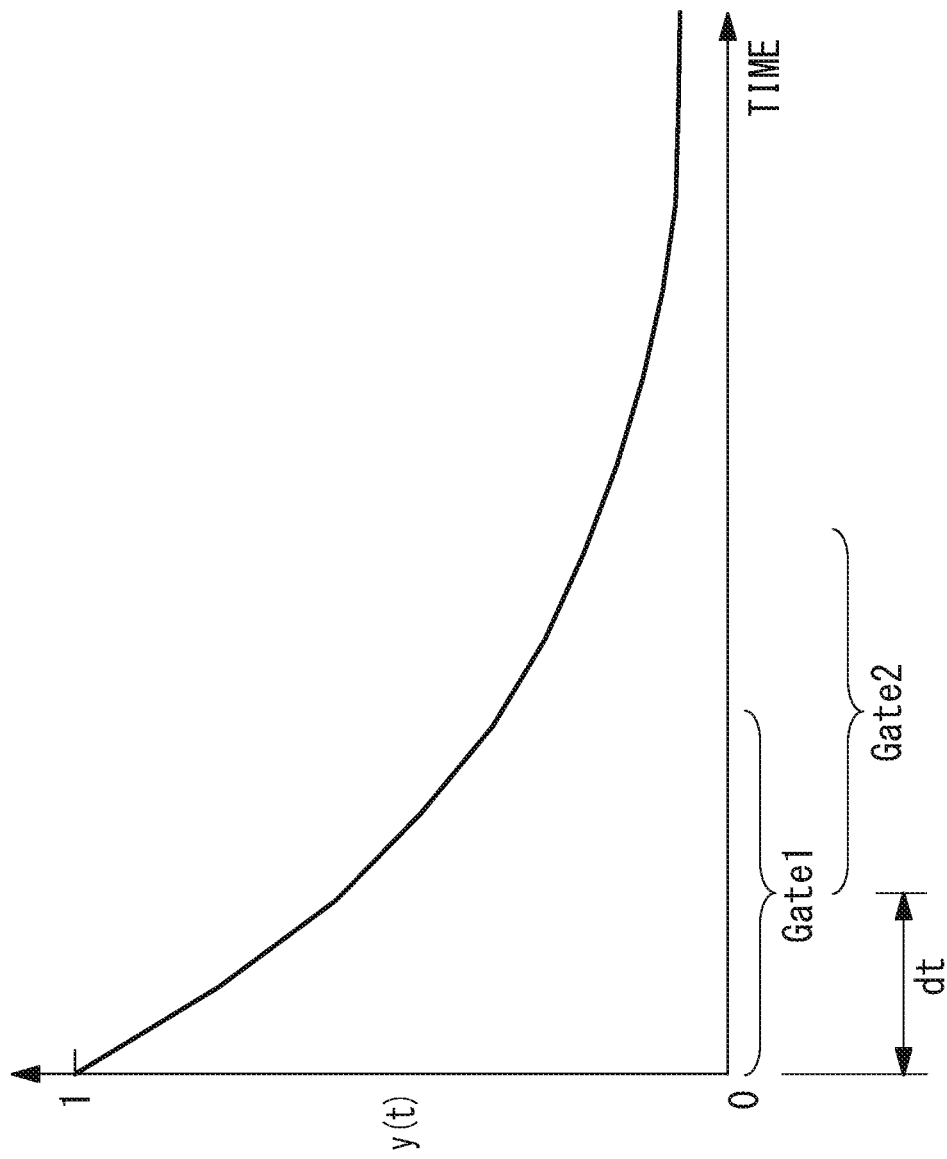
FIG. 5 is a diagram showing an example of an integration period set in the waveform in FIG. 4.

In addition, as shown in FIG. 5, the calculation unit 10 sets two time-integration gates, which are arbitrary integration periods, in the obtained waveform, and calculates the fluorescence lifetime coefficient T and the intensity coefficient k by using the ratio of the integration periods, as shown in Math 1.

$$\tau = \frac{dt}{\ln(Gate1/Gate2)} \quad \{\text{Formula 1}\}$$

$$k = \frac{2 * Gate1^3 * \ln(Gate1/Gate2)}{(Gate1^2/Gate2^2)dt}$$

Here, ln(Gate1/Gate2) indicates a value obtained by dividing the integral value of y(t) in the first gate by the integral value of y(t) in the second gate, Gate1 indicates the integration period of the first gate, Gate2 indicates the integration period of the second gate, and dt indicates the time difference between the first gate and the second gate.

As described above, with the signal acquisition device 1 according to this embodiment, there is an advantage in that it is possible to obtain the fluorescence lifetime coefficient T with high accuracy by eliminating the measurement error that occurs due to the finite response characteristics of the system without speeding up the system or performing complex and time-consuming processing such as deconvolution processing.

As a result, it is possible to configure the signal acquisition device 1 in a simple manner, with low cost.

In addition, because a hybrid photodetector is used as the photodetector 6 in this embodiment, it is possible to detect the fluorescence intensity with high accuracy by means of the stable response characteristics.

Note that, although a case where a gate method in which two time-integration gates serving as two integration periods are set is used has been illustrated as an example in this embodiment, the invention is not limited thereto, and the fluorescence lifetime coefficient T may be calculated by applying the exponential function to the waveform obtained by the calculation unit 10.

In addition, in the case in which the gate method is used, the calculation unit 10 in the signal acquisition device 1 may include an integration-period adjustment unit (not shown), may roughly calculate a fluorescence lifetime coefficient (provisional fluorescence lifetime coefficient) T by using a time-integration gate that is appropriately set at first by the integration-period adjustment unit, and may set an optimal integration-period width by using the calculated fluorescence lifetime coefficient T. For example, the optimal integration-period width may be set to be 2.5-times the roughly calculated fluorescence lifetime coefficient T, and an optimal time difference dt may be set to be half of the integration-period width.

By doing so, it is possible to estimate the fluorescence lifetime coefficient T with high accuracy even if the sample X and the fluorescent dye are unknown.

Figure 6:
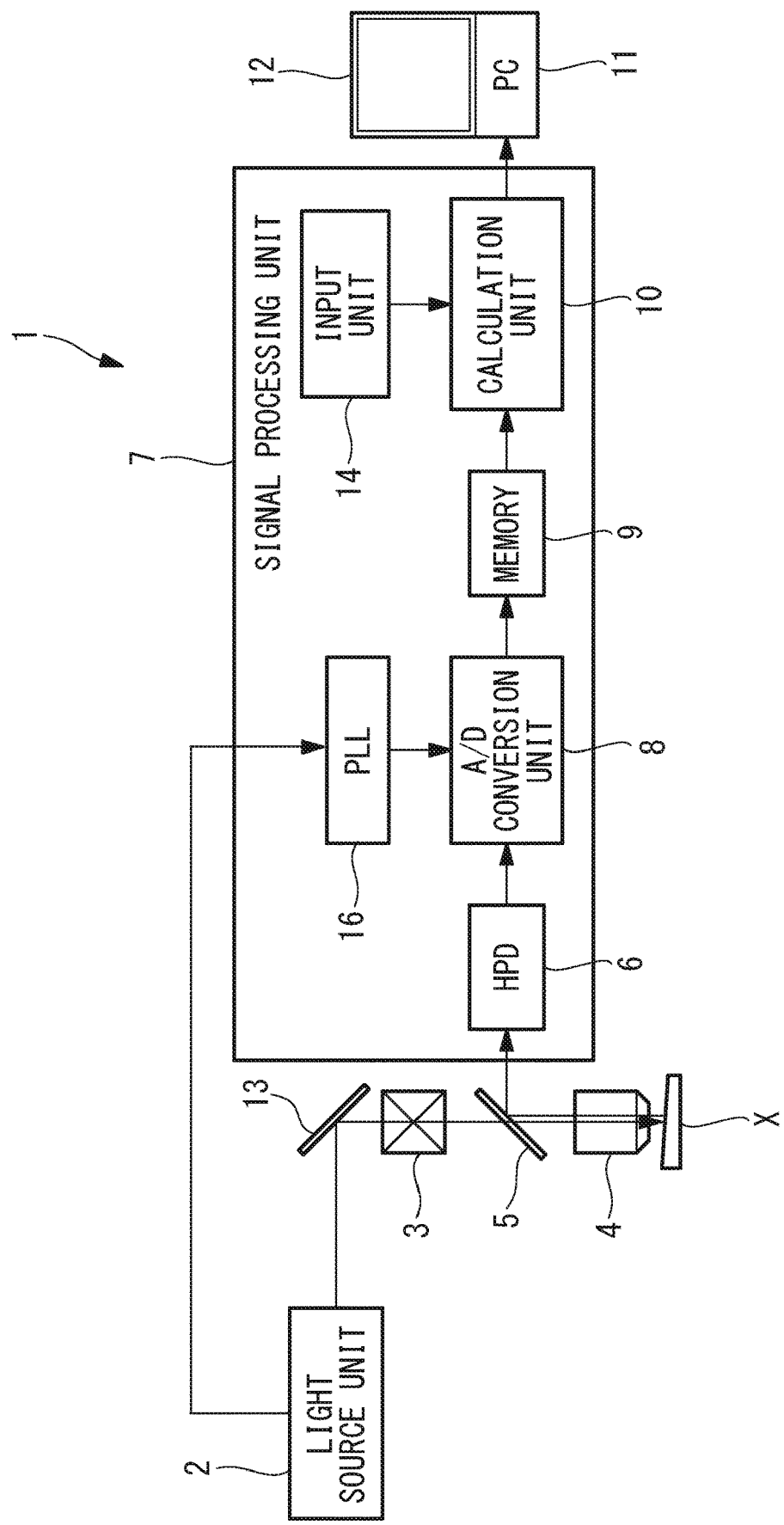
FIG. 6 is an overall configuration diagram showing a first modification of the signal acquisition device in FIG. 1.

In addition, as shown in FIG. 6, an input unit 14 for inputting an approximate value of the fluorescence lifetime coefficient $\tau$ may be provided, and the optimal integration-period width and time difference dt may be calculated on the basis of the input approximate value of the fluorescence lifetime coefficient $\tau$ to calculate the fluorescence lifetime coefficient $\tau$.

In a case in which the fluorescent dye to be used is known, the approximate value (standard value) of the fluorescence lifetime coefficient $\tau$ is often known; thus, there is an advantage in that it is possible to reduce the calculation time by inputting the approximate value.

In addition, it is known that a molecule having a larger fluorescence lifetime coefficient $\tau$ requires more time to obtain the fluorescence lifetime waveform y(t), and a lifetime range for the molecule to be measured is often known in advance; thus, the input unit 14 for inputting the lifetime range, and a recommended photon-number calculation unit (photon-number calculation unit: not shown) that calculates a required photon number on the basis of the approximate value input to the calculation unit 10 via the input unit 14 may be provided, and the recommended photon-number calculation unit may calculate the required photon number or the fluorescence intensity, on the basis of the lifetime range input via the input unit 14, and these may be displayed on a monitor 12.

By doing so, it is possible to perform an initial setting such that the required photon number or the fluorescence intensity displayed on the monitor 12 is achieved, and to calculate the fluorescence lifetime coefficient $\tau$ with high accuracy without reacquisition of data.

In addition, in this embodiment, the calculation unit 10 may calculate fluorescence-intensity information by integrating, at the individual scanning positions, the digital intensity signals output from the individual storage regions of the memory 9, and a fluorescence-intensity image may be acquired by arranging the fluorescence-intensity information in association with the individual scanning positions. In addition, a fluorescence-lifetime image may be acquired by arranging the fluorescence lifetime coefficients T calculated by the calculation unit 10 in association with the individual scanning positions.

Regarding a region in which the fluorescence intensity in each pixel of the acquired fluorescence image is extremely low, there is a possibility that the required photon number for accurately calculating the fluorescence lifetime coefficient $\tau$ is not satisfied; thus, such a region may be clearly indicated in the fluorescence-lifetime image, for example, by a method such as changing the color.

In other words, by clearly indicating the region where the measurement error may be large, it is possible to prevent an observer from incorrectly recognizing the fluorescence lifetime.

In addition, the calculation unit 10 in the signal acquisition device 1 may include: a fluorescence-intensity calculation unit (not shown) that calculates the fluorescence intensities at the individual scanning positions by integrating the fluorescence lifetime waveforms y(t) calculated by the first calculation unit of the calculation unit 10; and a required photon-number calculation unit (photon-number calculation unit: not shown) that calculates the required photon number on the basis of the fluorescence lifetime coefficient $\tau$ calculated by the second calculation unit of the calculation unit 10. The individual positions scanned by the scanner 3 may be displayed on the monitor 12 such that the scanning positions at which the required exposure time is not satisfied can be identified on the basis of the fluorescence-intensity information at the individual scanning positions, calculated by the fluorescence-intensity calculation unit, and the required photon number for accurately calculating the fluorescence lifetime coefficient $\tau$, calculated by the required photon-number calculation unit.

By doing so, the observer can observe on the monitor 12 whether or not the required exposure time is satisfied at the individual positions scanned by the scanner 3, by means of the fluorescence-intensity information and the required photon number calculated by the fluorescence-intensity calculation unit and the required photon-number calculation unit. In other words, it is possible to identify, on the monitor 12, the scanning positions at which the required exposure time is not satisfied, and to enable the observer to recognize that an error in the measurement of the fluorescence lifetime is likely to occur at the identified scanning positions.

Figure 7:
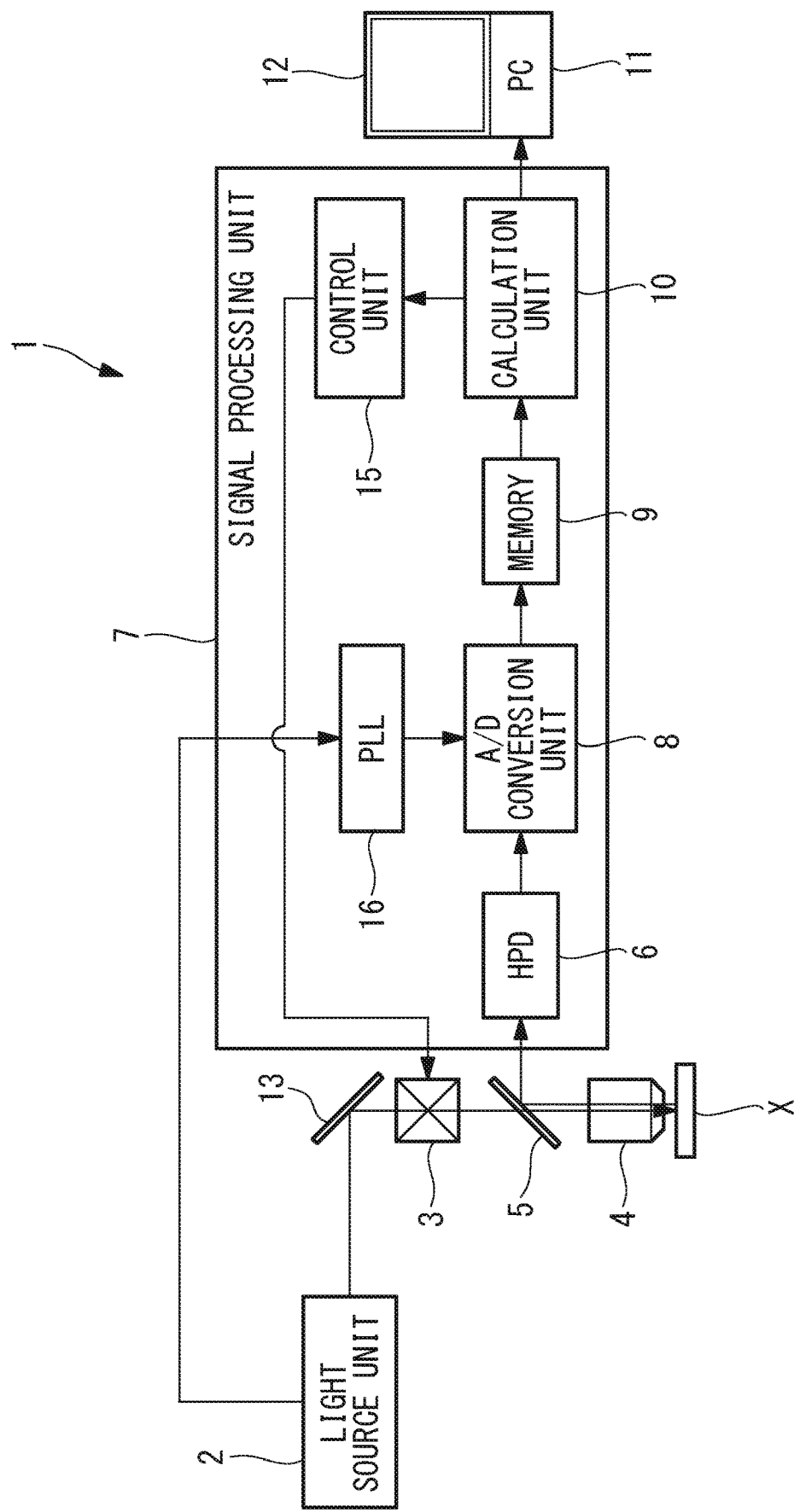
FIG. 7 is an overall configuration diagram showing a second modification of the signal acquisition device in FIG. 1.

In addition, as shown in FIG. 7, the signal acquisition device 1 may include a control unit 15 that calculates the required exposure time at the individual positions scanned by the scanner 3, on the basis of the fluorescence-intensity information at the individual scanning positions, calculated by the fluorescence-intensity calculation unit, and the required photon number for accurately calculating the fluorescence lifetime coefficient $\tau$, calculated by the required photon-number calculation unit, and that controls the scanner 3 so that the required exposure time is satisfied.

Figure 8:
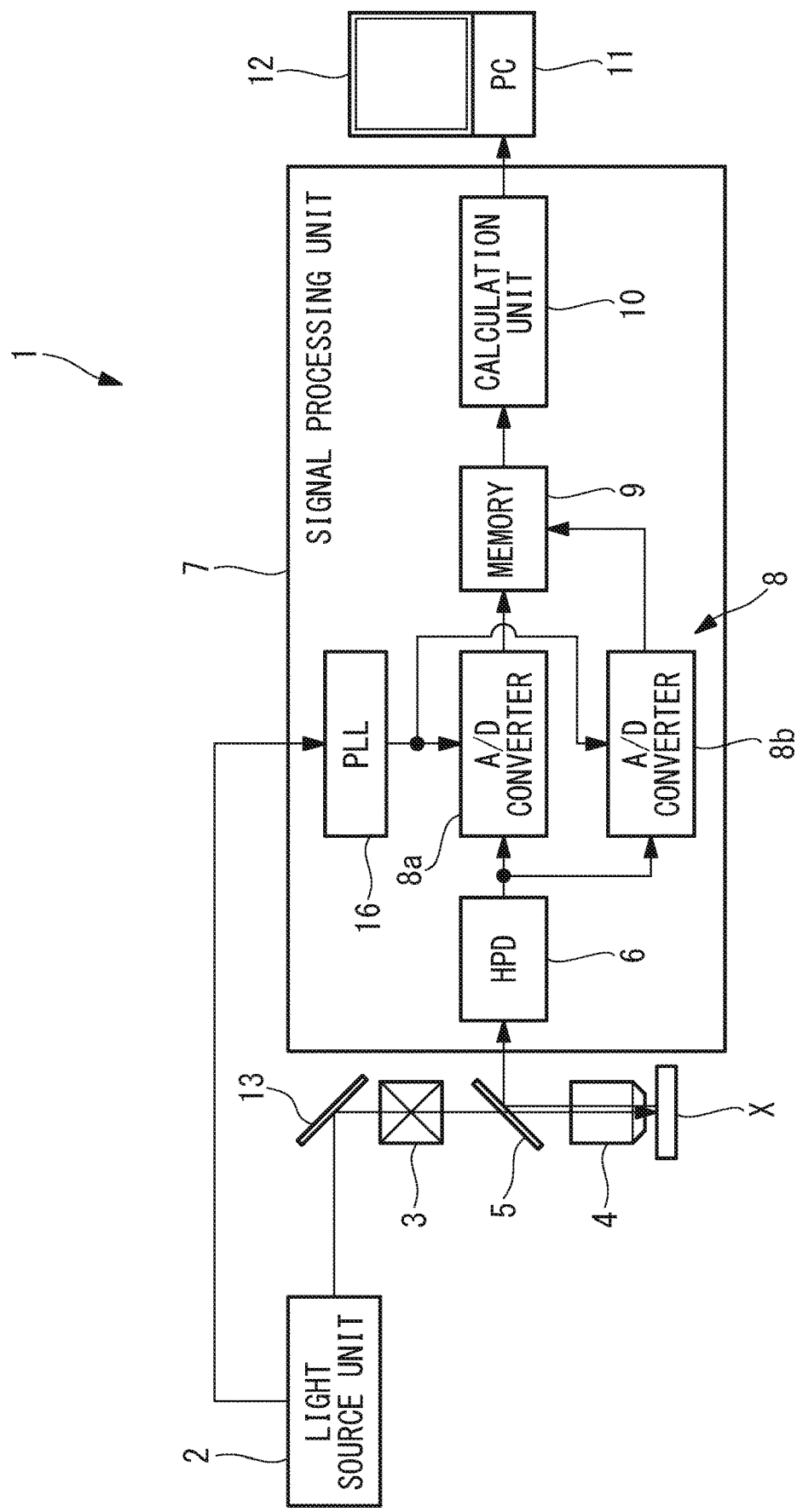
FIG. 8 is an overall configuration diagram showing a third modification of the signal acquisition device in FIG. 1.

In addition, as shown in FIG. 8, the A/D conversion unit 8 may include two A/D converters 8a, 8b in this embodiment, and by individually performing sampling of the intensity signal of the fluorescence detected by the photodetector 6, at the same sampling period mentioned above and at timings with different phases, non-uniform sampling may be performed as a whole.

By performing sampling at two points that are sufficiently close to each other, there is an advantage in that it is possible to improve the measurement accuracy of the fluorescence intensity, and to measure the fluorescence lifetime with high accuracy.

In addition, although the hybrid photodetector has been illustrated as an example of the photodetector 6 in this embodiment, alternatively, a PMT (photomultiplier tube), APD (avalanche photodiode) or the like may be employed.

In addition, although the laser scanning microscope including the scanner 3 has been illustrated as an example of the signal acquisition device 1 in this embodiment, alternatively, a device not including the scanner 3 may be employed.

As a result, the above-described embodiment leads to the following aspect.

An aspect of the present invention is directed to a signal acquisition device including: a light source unit that oscillates pulsed laser light at a specific repetition period; an optical system that focuses the laser light onto a sample, and that collects generated fluorescence; a detection unit that detects the fluorescence collected by the optical system; an A/D conversion unit that samples an intensity signal of the fluorescence detected by the detection unit, in synchronization with the repetition period of the light source unit, at a period that is an integer multiple of the repetition period, and that generates a digital intensity signal; a first calculation unit that obtains a fluorescence lifetime waveform on the basis of the digital intensity signal generated by the A/D conversion unit; and a second calculation unit that calculates a fluorescence lifetime coefficient from a waveform obtained by removing a region not corresponding to an exponential function from the fluorescence lifetime waveform obtained by the first calculation unit.

With this aspect, when the pulsed laser light emitted from the light source unit is focused onto the sample by the optical system, the fluorescence is generated on the sample. The generated fluorescence is collected by the optical system and is detected by the detection unit. The intensity signal of the fluorescence detected by the detection unit is sampled by the A/D conversion unit at the period that is an integer multiple of the repetition period of the laser light, and thus, the digital intensity signal is generated.

Then, the first calculation unit obtains the fluorescence lifetime waveform from the digital intensity signal, and the second calculation unit calculates the fluorescence lifetime coefficient from the waveform obtained by removing the region not corresponding to the exponential function from the obtained fluorescence lifetime waveform.

In other words, it is possible to calculate the fluorescence lifetime coefficient representing a fluorescence lifetime with high accuracy by reducing the influence of the system response without speeding up the system response or performing complex processing such as deconvolution.

In the abovementioned aspect, a scanning portion that scans the laser light emitted from the light source unit may be further provided, and the optical system may focus the laser light scanned by the scanning portion onto the sample, and may collect fluorescence generated at individual scanning positions on the sample.

With this configuration, when the pulsed laser light emitted from the light source unit is scanned by the scanning portion and is focused onto the sample by the optical system, the fluorescence generated at the individual scanning positions on the sample is collected by the optical system and can be detected by the detection unit.

In addition, in the abovementioned aspect, the first calculation unit may generate the fluorescence lifetime waveform by superposing, for each of the repetition periods, digital intensity signals sampled at the same sampling period.

By doing so, it is possible to generate the fluorescence lifetime waveform in a simple manner.

In addition, in the abovementioned aspect, the second calculation unit may set a plurality of integration periods in the fluorescence lifetime waveform obtained by the first calculation unit, and may calculate the fluorescence lifetime coefficient on the basis of an integral value of the fluorescence lifetime in each of the integration periods.

By doing so, it is possible to calculate the fluorescence lifetime coefficient, in a simple manner, from the fluorescence lifetime waveform obtained by the first calculation unit.

In addition, in the abovementioned aspect, an integration-period adjustment unit that optimizes the integration period on the basis of a provisional fluorescence lifetime coefficient calculated by using the plurality of integration periods that are arbitrarily set may be further provided, and the second calculation unit may calculate the fluorescence lifetime coefficient by using the integration period optimized by the integration-period adjustment unit.

By doing so, it is possible to improve the accuracy of the fluorescence lifetime coefficient calculated by the second calculation unit by using the optimized integration period.

In addition, in the abovementioned aspect, the second calculation unit may calculate the fluorescence lifetime coefficient by applying the exponential function to the fluorescence lifetime waveform obtained by the first calculation unit.

By doing so, it is possible to calculate the fluorescence lifetime coefficient in a simple manner.

In addition, in the abovementioned aspect, an input unit for inputting an approximate value of the fluorescence lifetime coefficient, and an integration-period adjustment unit that optimizes the integration period on the basis of the approximate value input via the input unit may be further provided, and the second calculation unit may calculate the fluorescence lifetime coefficient by using the integration period optimized by the integration-period adjustment unit.

With this configuration, because the approximate value of the fluorescence lifetime coefficient is often known in advance, by inputting the approximate value via the input unit, it is possible to calculate the fluorescence lifetime coefficient with high accuracy by facilitating the calculation for optimizing the integration period.

In addition, in the abovementioned aspect, an input unit for inputting an approximate value of the fluorescence lifetime coefficient, a photon-number calculation unit that calculates a required photon number on the basis of the approximate value input via the input unit, and a display unit that displays information related to the required photon number calculated by the photon-number calculation unit may be further provided.

Although it is known that a molecule having a larger fluorescence lifetime coefficient requires more time to estimate the lifetime thereof, the approximate value of the fluorescence lifetime coefficient is often known in advance; thus, with this aspect, the approximate value is input via the input unit, and the information related to the required photon number, which is calculated by the photon-number calculation unit on the basis of the input approximate value, is presented on the display unit. By doing so, it is possible to acquire a sufficiently bright fluorescence image satisfying the required photon number, and to improve the efficiency by eliminating the need for reacquisition of data. Here, the information related to the required photon number may include, in addition to the required photon number itself, the fluorescence intensity corresponding to the required photon number.

In addition, in the abovementioned aspect, a photon-number calculation unit that calculates a required photon number on the basis of the fluorescence lifetime coefficient calculated by the second calculation unit, and a display unit that displays information related to the required photon number calculated by the photon-number calculation unit may be further provided.

In addition, in the abovementioned aspect, a fluorescence-intensity calculation unit that calculates fluorescence intensities at the individual scanning positions by integrating the fluorescence lifetime waveforms obtained by the first calculation unit, and a display unit that displays the scanning positions such that the scanning positions at which the required photon number is not satisfied can be identified on the basis of the fluorescence intensities at the individual scanning positions, calculated by the fluorescence-intensity calculation unit, and the required photon number calculated by the photon-number calculation unit may be further provided.

By doing so, it is possible to identify, on the display unit, the scanning positions at which the required photon number is not satisfied, and to enable an observer to recognize that an error in the measurement of the fluorescence lifetime is likely to occur at the identified scanning positions.

In addition, in the abovementioned aspect, a fluorescence-intensity calculation unit that calculates fluorescence intensities at the individual scanning positions by integrating the fluorescence lifetime waveforms obtained by the first calculation unit, and a control unit that controls the scanning portion so that the fluorescence intensity satisfying the required photon number is achieved at the individual scanning positions, on the basis of the fluorescence intensities at the individual scanning positions, calculated by the fluorescence-intensity calculation unit, and the required photon number calculated by the photon-number calculation unit may be further provided.

By doing so, the control unit controls the scanning portion to adjust the exposure time of the laser light at the individual scanning positions, whereby the required photon number is satisfied at the individual scanning positions, and it is possible to acquire an intensity signal with less measurement error.

In addition, in the abovementioned aspect, the A/D conversion unit may include a plurality of A/D converters that perform sampling in a temporally non-uniform manner.

By doing so, each of the A/D converters performs sampling, at the period that is an integer multiple of the repetition period of the laser light, together with sampling performed by the other A/D converter in a temporally non-uniform manner. Thus, it is possible to improve the measurement accuracy of the intensity signal by sampling two points that are temporally close to each other, and to measure the fluorescence lifetime with high accuracy.

In addition, in the abovementioned aspect, the detection unit may include a hybrid photodetector.

By doing so, it is possible to ensure high quantitativeness by means of the hybrid photodetector, and to measure the fluorescence lifetime with high accuracy.

The present invention affords an advantage in that it is possible to measure a fluorescence lifetime with high accuracy by reducing the influence of the system response without speeding up the system response or performing deconvolution.

REFERENCE SIGNS LIST 1 signal acquisition device
2 light source unit
3 scanner (scanning portion)
4 objective lens (optical system)
6 photodetector (detection unit, hybrid photodetector: HPD)
8 A/D conversion unit
8a, 8b A/D converter
10 calculation unit (first calculation unit, second calculation unit)
12 monitor (display unit)
14 input unit
15 control unit
X sample

The invention claimed is:
1. A signal acquisition device comprising:
a light source that oscillates pulsed laser light at a specific repetition period;
an optical system that focuses the laser light onto a sample, and that collects generated fluorescence;
a photodetector that detects the fluorescence collected by the optical system;
an A/D converter that samples an intensity signal of the detected fluorescence, in synchronization with the repetition period of the light source unit, at a period that is an integer multiple of the repetition period, and that generates a digital intensity signal; and
one or more processors comprising hardware, the one or more processors being configured to:
obtain a fluorescence lifetime waveform on a basis of the generated digital intensity signal; and
calculate a fluorescence lifetime coefficient from a waveform obtained by removing a region not corresponding to an exponential function from the obtained fluorescence lifetime waveform.
2. The signal acquisition device according to claim 1, further comprising a scanner that scans the laser light emitted from the light source,
wherein the optical system focuses the laser light scanned by the scanning portion onto the sample, and collects fluorescence generated at individual scanning positions on the sample.
3. The signal acquisition device according to claim 2, wherein the obtaining of the fluorescence lifetime waveform generates the fluorescence lifetime waveform by superposing, for each of the repetition periods, digital intensity signals sampled at the same sampling period.
4. The signal acquisition device according to claim 2, wherein the calculating of the fluorescence lifetime coefficient sets a plurality of integration periods in the obtained fluorescence lifetime waveform, and calculates the fluorescence lifetime coefficient on a basis of an integral value of the fluorescence lifetime in each of the integration periods.
5. The signal acquisition device according to claim 4, wherein the one or more processors are further configured to optimize the integration period on a basis of a provisional fluorescence lifetime coefficient calculated by using the plurality of integration periods that are arbitrarily set, and
wherein the calculating of the fluorescence lifetime coefficient calculates the fluorescence lifetime coefficient by using the optimized integration period.
6. The signal acquisition device according to claim 4, wherein the one or more processors are further configured to optimize the integration period on a basis of an approximate value of the fluorescence lifetime coefficient input by a user, and
wherein the calculating of the fluorescence lifetime coefficient calculates the fluorescence lifetime coefficient by using the optimized integration period.
7. The signal acquisition device according to claim 4, further comprising a display,
wherein the one or more processors are further configured to calculate a required photon number on a basis of an approximate value of the fluorescence lifetime coefficient input by a user, and
wherein the display displays information related to the calculated required photon number.
8. The signal acquisition device according to claim 7, wherein the one or more processors are further configured to calculate fluorescence intensities at the individual scanning positions by integrating the obtained fluorescence lifetime waveforms, and
wherein the display displays the scanning positions so as to identify the scanning positions at which the required photon number is not satisfied on a basis of the calculated fluorescence intensities at the individual scanning positions, and the calculated required photon number.
9. The signal acquisition device according to claim 7, further comprising a controller,
wherein the one or more processors are further configured to calculate fluorescence intensities at the individual scanning positions by integrating the obtained fluorescence lifetime waveforms, and
wherein the controller controls the scanning portion so that the fluorescence intensity satisfying the required photon number is achieved at the individual scanning positions, on a basis of the calculated fluorescence intensities at the individual scanning positions, and the calculated required photon number.
10. The signal acquisition device according to claim 4, further comprising a display,
wherein the one or more processors are further configured to calculate a required photon number on a basis of the calculated fluorescence lifetime coefficient; and wherein the display displays information related to the calculated required photon number.

11. The signal acquisition device according to claim 10, wherein the one or more processors are further configured to calculate fluorescence intensities at the individual scanning positions by integrating the obtained fluorescence lifetime waveforms, and wherein the display displays the scanning positions so as to identify the scanning positions at which the required photon number is not satisfied on a basis of the calculated fluorescence intensities at the individual scanning positions, and the calculated required photon number.

12. The signal acquisition device according to claim 10, further comprising a controller, wherein the one or more processors are further configured to calculate fluorescence intensities at the individual scanning positions by integrating the obtained fluorescence lifetime waveforms, and wherein the controller controls the scanning portion so that the fluorescence intensity satisfying the required photon number is achieved at the individual scanning positions, on a basis of the calculated fluorescence intensities at the individual scanning positions, and the calculated required photon number.

13. The signal acquisition device according to claim 1, wherein the calculating of the fluorescence lifetime coefficient calculates the fluorescence lifetime coefficient by applying the exponential function to the obtained fluorescence lifetime waveform.

14. The signal acquisition device according to claim 1, wherein the A/D converter comprises a plurality of A/D converters that perform sampling in a temporally non-uniform manner.

15. The signal acquisition device according to claim 1, wherein the photodetector comprises a hybrid photodetector.

* * * * *